UNITED STATES PATENT OFFICE.

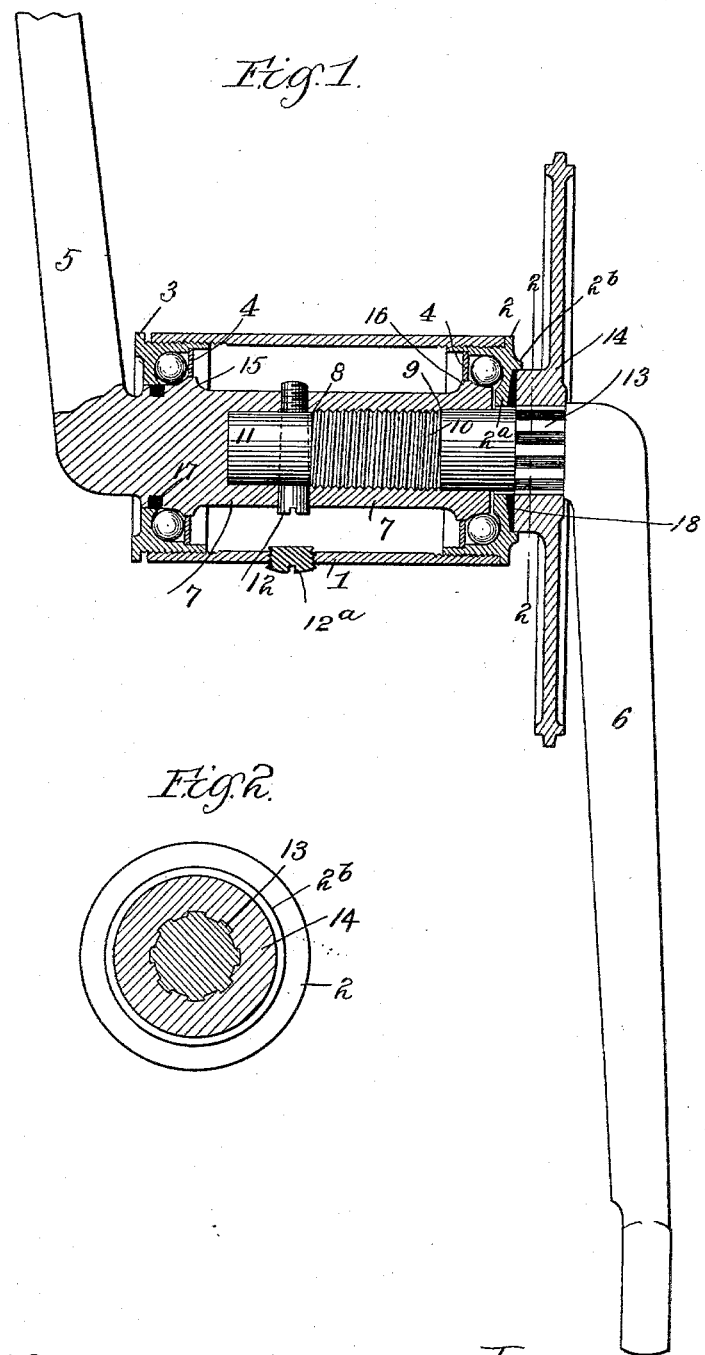

WILLIS S. BROWN, OF BELVIDERE, ILLINOIS, ASSIGNOR TO THE NATIONAL SEWING MACHINE COMPANY, OF SAME PLACE.

CRANK-SHAFT FOR VELOCIPEDES.

SPECIFICATION forming part of Letters Patent No. 596,846, dated January 4, 1898.

Application filed August 12, 1896. Serial No. 602,506. (No model.)

*To all whom it may concern:*

Be it known that I, WILLIS S. BROWN, a citizen of the United States, residing at Belvidere, in the county of Boone and State of Illinois, have invented certain new and useful Improvements in Crank-Shafts for Velocipedes, of which the following is a full, clear, and exact specification.

My invention relates to cranks and crank-shafts for use on velocipedes or bicycles, and more especially to that type in which each of the cranks is formed integrally with a part of the crank-shaft, which consists of a number of sections detachably secured together.

The object of my invention is to provide an improved and simple construction of combined shaft and cranks in which the shaft shall consist of but two simple parts, each having one of the cranks formed integrally therewith.

Another object of my invention is to form both of the crank-shaft cones integrally with one section of the two-part shaft.

With these ends in view my invention consists in certain features of novelty in the construction, combination, and arrangement of parts by which the said objects and certain other objects hereinafter appearing are attained, all as fully explained with reference to the accompanying drawings, and particularly pointed out in the claim.

In the said drawings, Figure 1 is a plan section of a crank-hanger and my improved combined shaft and cranks. Fig. 2 is a transverse sectional view taken on the line 2 2, Fig. 1.

1 represents the barrel of the crank-hanger, whose ends are screw-threaded internally and provided with the adjustable cups 2 3, respectively, in which the races for the balls are formed, the balls being held in place in such races by means of retaining-rings 4, forced into the inner ends of the cups 2 3.

5 6 represent the cranks, the former of which is formed integrally with one section 7 of the crank-shaft, which section is hollow and screw-threaded interiorly between the points 8 9. The other crank 6 is formed integrally with the other section of the crank-shaft, which is provided with a screw-threaded portion 10, screwing into the internal threads of the hollow section 7. The threaded portion 10 might obviously extend throughout the length of the interior of the hollow section 7; but it is preferable to form a plain portion 11 on the end of the internal section, which abuts against the end of the socket formed in the hollow section, and thus limits the relative rotation of the two sections of the shaft when being screwed together. After the parts have been screwed together in this manner they may be held against retrograde movement by any suitable means—such, for instance, as a cotter 12, which passes through both sections of the shaft and has a threaded end screwing into the side of the hollow section, as clearly shown in the drawings, thus avoiding the possibility of the parts unscrewing when backpedaling.

The barrel of the crank-hanger may be provided with a suitable opening closed by a screw-cap 12ª for the insertion of the cotter 12 after the parts have been screwed together within the crank-hanger; or, if desired, the parts may be so proportioned that the cranks and crank-shaft may be slipped through the crank-hanger after they are screwed together and the cotter inserted.

One end of the internal section of the crank-shaft, near the crank 6, is provided with an enlarged shoulder, on which is formed a series of teeth or corrugations 13, which engage with complementary corrugations formed in the hub of the sprocket-wheel 14, thus constituting means for securely holding the sprocket against independent rotation on the crank-shaft.

The hollow section 7 of the crank-shaft is of sufficient length to project from one set of balls to the other, and upon the periphery of this hollow section are formed both cones 15 16, upon which the balls run, the cones being hardened to the proper degree, while the remaining portions of the hollow section 7 and the crank 5 are allowed to retain the requisite degree of elasticity and malleability.

The outer end of the hollow section 7 is surrounded by the cup 3, and such outer end is provided with a groove containing a packing-ring 17, which is located at the intersection of the cup 3 and the section 7, so as to arrest the passage of any foreign matter that might find its way between the cup and shaft. The other end of the section 7 is overlapped by a flange 2ª of the cup 2, but does not pass through such cup 2, while the cup 2 is provided with a laterally-projecting flange 2ᵇ, which overlaps the hub of the sprocket-wheel 14, and which, in conjunction with such hub, constitutes the housing for a packing-ring 18, which surrounds the internal section of the crank-shaft and prevents the passage of grit to the bearings at this end of the crank-hanger.

With a device thus constructed it will be seen that the entire crank-shaft and pair of cranks are composed of but two simple parts, which are of such form as to enable them being produced by drop-forging and then finished on the lathe and tempered, thus greatly reducing the cost of manufacture while at the same time producing a device of great strength and durability and of such simple construction that any one may readily understand its mechanism and operation and be able to readily disconnect the parts or put them together without the aid of a machinist or special appliances.

Having thus described my invention, what I claim as new, and desire to secure by Letters Patent, is—

The combination with a crank-hanger having the cups 2 3 secured therein and provided with antifriction-balls, of a crank having a hollow section of crank-shaft formed integrally therewith and provided on its exterior with a pair of cones, said hollow section passing through said cup 3 and terminating within said cup 2 and the cup 2 being provided with the flange 2ª overlapping the end of said hollow section of crank-shaft, a second crank having another section formed integrally therewith and projecting through said flange 2ª and being removably secured in said hollow section of shaft, the sprocket-wheel secured on said second section of shaft between said flange 2ª and said second crank, the flange 2ᵇ surrounding the hub of said sprocket and the packing-ring 18 located between the flange 2ª and the hub of said sprocket, substantially as set forth.

WILLIS S. BROWN.

Witnesses:
CHARLES H. PIERCE,
F. D. E. BABCOCK.